(12) United States Patent
Shane

(10) Patent No.: US 7,093,615 B2
(45) Date of Patent: Aug. 22, 2006

(54) WATER SAVING FAUCET VALVE

(76) Inventor: Alexander M. Shane, 8756 Marin Cir., 071, 513C, Huntington Beach, CA (US) 92646

( * ) Notice: Subject to any disclaimer, the term of this patent is extended or adjusted under 35 U.S.C. 154(b) by 29 days.

(21) Appl. No.: 10/894,538

(22) Filed: Jul. 20, 2004

(65) Prior Publication Data

US 2006/0016496 A1    Jan. 26, 2006

(51) Int. Cl.
    *F16K 21/04*    (2006.01)
(52) U.S. Cl. .............. 137/801; 137/901; 251/354; 251/339; 251/262
(58) Field of Classification Search ........... 137/801, 137/901; 251/354, 339, 262, 295; 4/624
See application file for complete search history.

(56) References Cited

U.S. PATENT DOCUMENTS

| | | | | |
|---|---|---|---|---|
| 576,068 A * | 1/1897 | O'Lally | ............... | 251/156 |
| 602,598 A * | 4/1898 | Field | ............... | 251/320 |
| 615,774 A * | 12/1898 | Zimmerman | ............... | 251/156 |
| 635,104 A * | 10/1899 | Lunken et al. | ............... | 137/614.11 |
| 2,269,127 A * | 1/1942 | Riley | ............... | 137/442 |
| 2,785,881 A * | 3/1957 | Dolan | ............... | 239/417.3 |
| 5,288,053 A * | 2/1994 | Young | ............... | 251/98 |
| 5,290,008 A * | 3/1994 | Young | ............... | 251/99 |
| 6,588,682 B1 * | 7/2003 | Flieger | ............... | 239/428.5 |
| 2004/0011978 A1 * | 1/2004 | Shen et al. | ............... | 251/51 |

* cited by examiner

*Primary Examiner*—Eric Keasel
*Assistant Examiner*—Craig Schneider
(74) *Attorney, Agent, or Firm*—Don C. Lawrence; MacPherson Kwok Chen & Heid

(57) ABSTRACT

A water saving faucet valve includes an elongated body having inlet and outlet ends, and high and low pressure chambers interconnected by a coaxial flow channel. A valve stem is slidably retained in the flow channel to move between a lowered position, in which water is prevented from flowing through the valve, and a raised position, in which water is permitted to flow through the valve. The valve stem is raised and lowered by movement of a cam on a shaft that is rotated by movement of an elongated actuation arm, such that the valve can be fully actuated by a slight pressure applied to the arm, and automatically shuts off when the pressure is removed. The valve includes apparatus for coupling it to the outlet of a conventional standard faucet, and may include apparatus for aerating the water flowing through it.

16 Claims, 5 Drawing Sheets fig.3 fig.4 fig.5 fig.6 fig.7

FIG. 13

FIG. 14

WATER SAVING FAUCET VALVE

CROSS-REFERENCE TO RELATED APPLICATIONS (Not Applicable)

STATEMENT REGARDING FEDERALLY SPONSORED RESEARCH OR DEVELOPMENT (Not Applicable)

REFERENCE TO APPENDIX (Not Applicable)

BACKGROUND OF THE INVENTION

1. Field of the Invention

This invention relates to fluid flow control devices in general, and in particular, to an easily controlled, water-saving, flow-control valve for standard water faucets.

2. Related Art

Washing one's hands at a faucet typically involves wetting the hands with water from the faucet, soaping the hands, mechanically massaging or scrubbing the soapy hands to loosen dirt and other contaminants thereon, and then rinsing the dirt- and contaminant-laden soap from the hands with clean water from the faucet. It will be seen that, for other than faucets left continuously running, this procedure necessarily entails two additional steps, viz., initiating flow of water from the faucet before washing, and terminating the flow afterwards, and further, that many other daily acts of personal hygiene, e.g., teeth brushing, hair combing, and drawing a cup of drinking water can also involve these same two steps.

The on-off flow control steps typically involve the simultaneous, manual actuation of at least one, and typically, two valves supplying water to the faucet, viz., the hot- and cold-water supply valves, although single-handle hot-and-cold faucet flow control valves are known. In any case, the foregoing arrangement can lead to certain problems and inefficiencies.

One of these relates to a waste of water. Thus, although it is unnecessary to have a continuous flow of water during the intermediate steps of, e.g., hand washing, or teeth brushing, many leave the water running throughout the entire activity, and sometimes, even afterwards, either through carelessness or a reluctance to touch the control valves with wet, soapy or just-washed hands. This can result in a substantial waste of expensive, treated water, and has led some institutions to incorporate devices, such as water-flow timing mechanisms, or complex, infrared user-presence-detection devices, to automatically terminate the water flow from the faucet after a predetermined amount of time has elapsed or the user has departed the faucet location, in an effort to reduce the amount of water wasted.

Another problem relates to "cross-contamination," or "re-contamination," that can result when the control valve handles of a faucet are touched, and thereby contaminated, with dirty hands, or alternatively, when washed hands contact previously contaminated faucet handles and are thereby re-contaminated. In some strict-antiseptic standard environments, e.g., surgical scrub rooms, this problem has lead to the implementation of foot- or knee-actuated faucet control valves, so that the user's hands never come into contact with the control valves of the faucet.

Yet another problem relates to the inability of small children or persons with certain physical disabilities to manipulate faucet valves with adequate facility. Thus, small children may be able to reach the outlet of a faucet without a height "booster," but still require adult assistance to reach and/or manipulate the handles of the control valves to achieve an appropriate water flow rate and/or safe temperature. Adults with, e.g., severe arthritis, may be able to reach the valve handles easily, but may be unable to manipulate them without experiencing severe pain.

A long-felt but as yet unsatisfied need therefore exists for an inexpensive, yet reliable faucet control valve that avoids wasting water, is more sanitary, and is easier both to install and use, than conventional faucet valves.

BRIEF SUMMARY OF THE INVENTION

In accordance with the present invention, a water saving faucet valve is provided that is less expensive, more reliable and sanitary, and easier to install and use, than conventional standard faucet control valves.

The novel valve comprises an elongated, generally cylindrical valve body having an upper inlet end and a lower outlet end. The valve body defines an upper, high-pressure chamber opening to the inlet end, a lower, low-pressure chamber opening to the outlet end, and a coaxial flow channel interconnecting the high pressure chamber to the low pressure chamber. A valve stem is slidably retained in the flow channel for axial movement between a lowered, valve-closed position, and a raised, valve open position. The valve stem comprises an elongated shaft having an upper end with apparatus thereat for sealingly engaging the valve body at an upper end of the flow channel when the valve stem is in the lowered, or closed position, such that water is prevented from flowing through the flow channel from the high pressure chamber to the low pressure chamber, and for disengaging, or separating from, the valve body when the valve stem is in the raised position, such that water is permitted to flow through the flow channel from the high pressure chamber to the low pressure chamber. The elongated shaft of the valve stem may include one or vertical flutes that, in one possible embodiment, are straight, and in another possible embodiment, are tapered radially inward to a successively greater depth toward the lower end of the valve stem. The tapered flutes progressively increase the area of the entrance to the flow channel, and hence, the flow rate of the water through the channel, as the valve stem is progressively raised from the lower, valve-closed position, to the raised, valve-open position, In one possible embodiment, the sealing apparatus at the upper end of the valve stem comprises a sealing ball disposed in the high pressure chamber concentrically above the upper end of the valve stem. In another advantageous embodiment, the sealing ball is omitted, the valve stem is seated in a removable valve stem seat, and the sealing apparatus comprises an enlarged, flattened head at the upper end of the valve stem that overhands and mates with the valve stem seat. The valve stem also comprise a lower end defining a cam follower. The cam follower may comprise a fenestrated plate, a roller rotatably mounted to the shaft, or a hemispherical surface at the end of the shaft.

A cam shaft is rotatably mounted in the valve body below the valve stem cam follower. A cam is mounted on the cam shaft for conjoint rotation therewith. The cam has a camming surface disposed in sliding engagement with the lower end of the valve stem. An actuating arm is connected to the cam shaft, and is movable between first and second positions that, through the agency of the cam, respectively lower and raise the valve stem with mechanical advantage between its lowered and raised positions.

The actuating arm comprises a semicircular bail having opposite ends respectively connected to opposite ends of the cam shaft for conjoint rotation therewith, and an elongated rod affixed at a generally right angle to the bail such that the rod hangs down below the valve along a line generally parallel to the axis of the valve body. A weight may be disposed at a lower end of the rod for gravity assisted shutoff of the valve. The valve can include apparatus for temporarily locking the actuating arm in the second, raised position, such that the valve is held open without pressure on the actuating arm. The locking apparatus may comprise a barrel slidably disposed on the elongated rod. The barrel can have a first catch feature, e.g., a lip or a flange, disposed thereon, and the valve body may have a second catch feature disposed thereon, e.g., a pin, tang, or recess on or in the valve body, adapted to engage and hold the first catch feature of the locking barrel in a complementary, locking engagement when the actuating arm is in the second, valve-open position.

In one advantageous embodiment, an aerator cup can be retained in the low-pressure chamber of the valve body for aerating water flowing through the valve. The aerator cup may comprise a floor containing a plurality of vertical apertures disposed adjacent to the outlet end of the valve, and annular side walls that contain a plurality of radial apertures extending upwardly from the floor. Additionally, a fine mesh filter plate may be disposed in the inlet end of the valve body to filter out any particulate matter in the water entering the valve.

The valve also includes apparatus for coupling the inlet end of the valve to an outlet end of a conventional standard faucet. The coupling apparatus may comprise internal or external threads at the inlet end of the valve body, or an adaptor having a mechanism at a first end for sealingly engaging the outlet end of the standard faucet, and a mechanism at a second end thereof for sealingly engaging the inlet end of the valve body. The outlet end of the valve may advantageously include a mechanism for coupling an accessory item, e.g., a hose or diverter, to the valve.

A better understanding of the above and many other features and advantages of the novel valve of the present invention may be had from a consideration of the detailed description thereof below, particularly if such consideration is made in conjunction with the several views of the appended drawings.

DETAILED DESCRIPTION OF THE INVENTION

Figure 1:
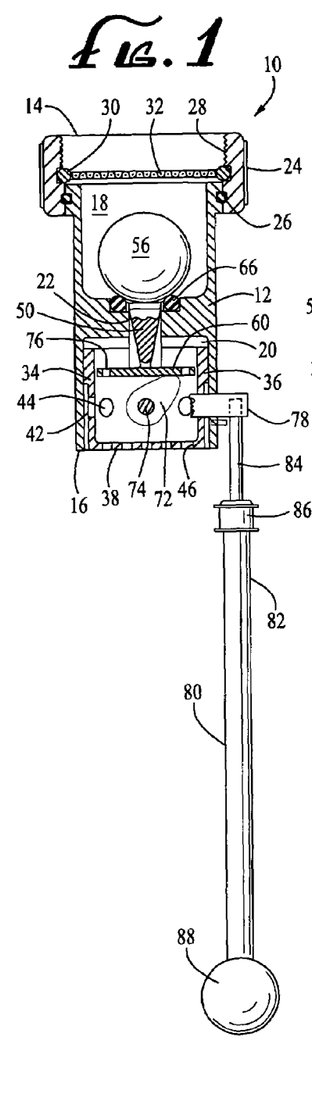
FIG. 1 is a partial cross-sectional elevation view of a first exemplary embodiment of a water-saving faucet valve in accordance with the present invention, showing the valve in an off, or closed, position.
Figure 2:
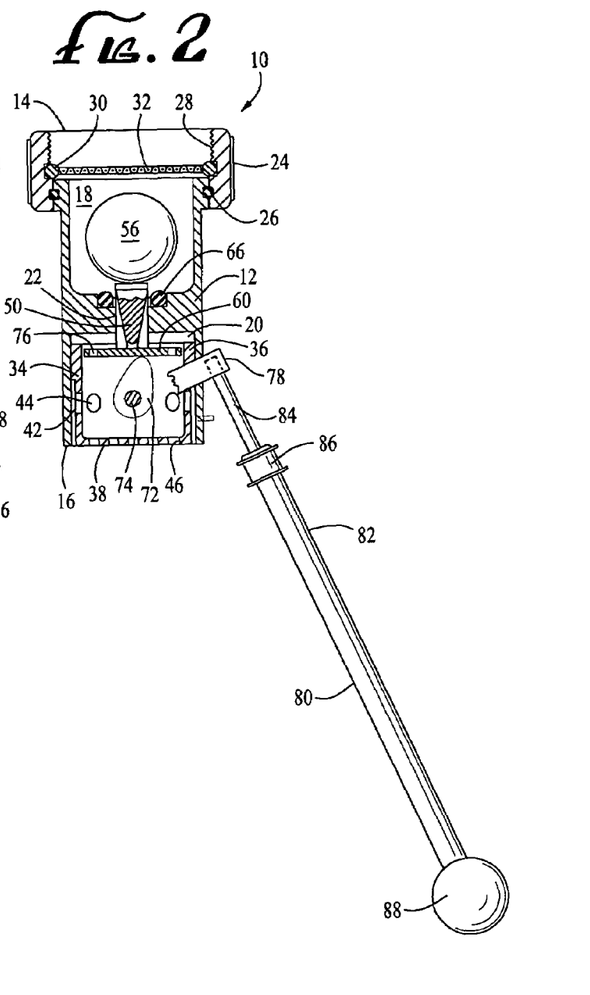
FIG. 2 is a partial cross-sectional elevation view of the valve of FIG. 1, showing the valve in an on, or open, position.

As illustrated in FIGS. 1 and 2, a first exemplary embodiment of the novel valve 10 of the present invention comprises an elongated, generally cylindrical valve body 12 having opposite inlet and outlet ends 14 and 16, a high-pressure chamber 18 opening to the inlet end, a low-pressure chamber 20 opening to the outlet end, and a coaxial flow channel 22 of a reduced diameter connecting the high pressure chamber to the low pressure chamber.

A faucet-coupling barrel 24 is rotatably retained on the inlet end 14 of the valve 10, e.g., by wire or a C-shaped retaining ring 26. The particular embodiment of coupling barrel 24 illustrated includes internal threads 28 that enable the valve 10 to be screwed onto an externally threaded faucet outlet (not illustrated) in place of the conventional aerator (not illustrated) typically provided thereon. For faucets equipped with internal threads that accommodate an externally threaded aerator, the coupling barrel 24 may alternatively incorporate matching external threads, or in yet another possible embodiment, a simple, internal-to-external threaded adapter (not illustrated) that is available in most hardware stores can be supplied along with the valve 10 illustrated to enable it to be coupled with a standard faucet of either type.

A sealing member 30, such as the O-ring illustrated in FIGS. 1 and 2, is preferably seated inside the coupling barrel 24 and below the threads 28 such that it makes compressive contact with the outlet of the conventional faucet when the coupling barrel is screwed fully thereon, thereby effecting a secure, leak-proof seal between the faucet and the valve 10. A filter plate 32 comprising a fine screen or mesh material may be incorporated into the sealing member 30, or alternatively, may be seated above or below it within the coupling barrel 24, to filter out any particulate matter contained in the water entering the valve 10 from the faucet.

An aerator cup 34 is retained in the low-pressure chamber 20 of the valve 10 for aerating the water flowing through the valve. The aerator cup 34 illustrated has an annular sidewall 36 that extends upward from a horizontal floor 38 disposed adjacent to the outlet end 16 of the valve 10. The diameter of an upper portion of the sidewall 36 of the aerator cup 34 is sized to conform closely to the cylindrical interior sidewall of the low-pressure chamber 20 of the valve 10, such that the aerator cup slides into the outlet end 16 of the valve with a close, sliding fit. The diameter of a lower portion of the sidewall 36 of the aerator cup 34 is slightly reduced to define an open-ended annular recess 42 between the aerator cup and the interior sidewall of the low-pressure chamber 16 of the valve 10. A plurality of radial apertures 44 extend through the sidewall 36 of the aerator cup 34 and open into the annular recess 42. This arrangement enables water flowing past the radial apertures 44 to entrain air drawn in through the apertures 44 and recess 42 by a siphon effect, thereby aerating the water with large bubbles of air. This aeration effect is then enhanced by a plurality of apertures 46 formed through the floor 38 of the aerator cup 34, which act like small nozzles to break the large air bubbles down into finer bubbles and to entrain them into the water as it flows from the outlet end 16 of the faucet 10.

The flow of water through the valve 10 is controlled by axial movement of a valve stem 50 that is slidably retained in the coaxial flow channel 22 of the valve for movement between a raised, valve-open position, and a lowered, valve closed position, as illustrated FIGS. 1 and 2, respectively. As respectively illustrated in two possible embodiments thereof in FIGS. 3 and 4, the valve stem 50 comprises an elongated shaft 52 having an upper sealing end 54 that, in one embodiment, supports, but is not connected to, a freely movable sealing ball 56 disposed concentrically over the valve stem in the high-pressure chamber 18 of the valve, and an opposite lower second end 58 comprising, in one possible embodiment, a disk-shaped cam follower plate 60.

Figure 3:
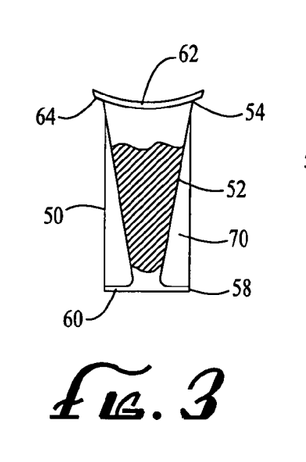
FIG. 3 is a partial cross-sectional elevation view of an alternative valve stem of the novel faucet.

In one possible embodiment, illustrated in the enlarged, partial cross-sectional elevation view of FIG. 3, the upper, sealing end 54 of the valve stem 50 comprises an arcuate spherical segment 62 having a circumferential flange 64. The spherical segment 62 is cupped upwardly to conformingly support a sealing ball 56 over the center of the high-pressure end of the coaxial flow channel 22 such that, in the lowered position of the valve stem 52, both the sealing ball 56 and the circumferential flange 64 of the spherical segment simultaneously contact a resilient sealing element 66, for example, an O-ring (see FIGS. 1 and 2) seated in a corresponding recess around the entrance of the flow channel 22, to close off the flow of water through the coaxial flow channel 22, and hence, through the valve 10.

Figure 4:
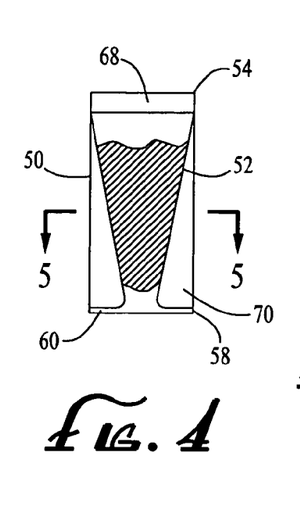
FIG. 4 is a partial cross-sectional elevation view of a valve stem of the novel faucet.

In another possible embodiment, illustrated in the enlarged, partial cross-sectional elevation view of FIG. 4, the sealing end 54 of the valve stem 50 can terminate in a simple, flat end 68. In this embodiment, it is preferable that the sealing element 66 itself include some feature for centering the sealing ball 56 over the upper, high-pressure end of the coaxial flow channel 22, such as is provided by the toroidal shape of the O-ring 66 illustrated. In such an embodiment, the compressive sealing force exerted by the sealing ball 56 on the sealing member 66 in the presence of a hydraulic pressure differential between the high and low pressure chambers 18 and 20 of the valve 10 acts to deform the sealing member radially inward against the circumferential side wall of the flat cylindrical cap 68 of the valve stem 50 to effect, in cooperation with the sealing ball, a tight, compression seal of the flow channel 22 when the valve stem, and hence, the valve, is in the lowered, valve-closed position.

Figure 5:
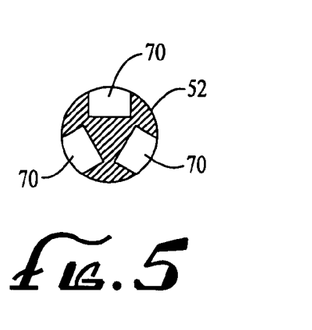
FIG. 5 is a cross-sectional view of the valve stem of FIG. 4, as viewed along the sectional lines 5—5 taken in FIG. 4.

As illustrated in FIGS. 3–5, the valve stem 50 includes longitudinal flutes 70 in the elongated shaft 52 to admit water into the coaxial flow channel 22 when the valve stem is raised from the off, or closed, position shown in FIG. 1. The flutes 70 may taper radially inward to a successively greater depth toward the second end 58 of the valve stem. FIG. 5 is a cross-sectional view of the elongated shaft 52, as taken along the line 5—5 in FIG. 4, showing the flutes 70. Each of the flutes 70 defines a channel for the flow of water from the high-pressure chamber 18, through the coaxial flow channel 22, and into the low-pressure chamber 20, when the sealing end 54 of the valve stem 50 and the sealing ball 56 are displaced upwardly from engagement with the valve body 12 and sealing element 66, as illustrated in FIG. 2. It may be seen that the effect of the tapered flutes 70 is to progressively increase the area of the entrance to the flow channel 22, and hence, the flow rate of the water through the channel, as the valve stem 50 is progressively raised from a valve-closed position in contact with the sealing element 66, as illustrated in FIG. 1, to a valve-open position, as illustrated in FIG. 2.

As described above, the valve stem 50 can comprise a cam follower plate 60 disposed at the second, or lower end 58 of the elongated valve stem shaft 52, which is sized to move within the aerator 34 with a sliding fit, and as illustrated in FIGS. 1 and 2, the plate may be fenestrated with a plurality of through-apertures 76 to enable water flowing from the flow channel 22 to pass through the cam follower plate and into the low pressure chamber 20 and aerator of the valve. The valve stem is supported from below by a cam 72 that is mounted on a rotatable cam shaft 74 for conjoint rotation therewith. In one possible alternative embodiment (not illustrated), the cam follower plate 60 can be replaced by a roller journalled at the second end 58 of the elongated valve stem shaft 52 for making rolling contact with the cam 72, and in yet another possible embodiment (not illustrated), the cam follower plate 60 can be omitted altogether, and the second end 58 of the elongated shaft 52 can be formed into a polished, hemispherical surface for making sliding contact with the camming surface of the cam.

The cam shaft 74 has opposite ends respectively journalled for rotation in aligned pairs of apertures that extend through the respective side walls of both the valve body 12 and the aerator 34. This arrangement both enables the cam shaft 74 to be rotated relative to the valve body 12 for actuation of the valve 10, and serves to captivate the aerator 34 within the low-pressure chamber 20 of the valve body 12.

Figure 6:
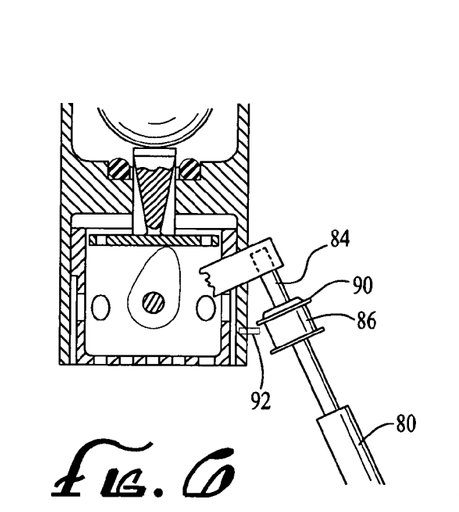
FIG. 6 is an enlarged, partial cross-sectional elevation view of the valve of FIG. 2, showing the valve temporarily locked in the open position by operation of a locking barrel.
Figure 7:
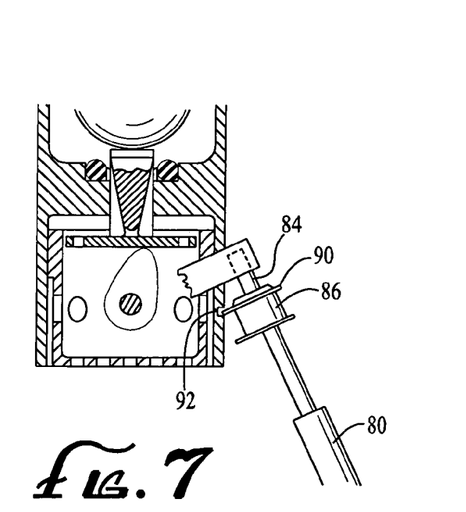
FIG. 7 is view similar to FIG. 6, showing the valve temporarily locked in the open position by an alternative operation of a locking barrel.

A semicircular hoop, or bail 78 has respective ones of its two opposite ends affixed to respective ones of the two opposite ends of the cam shaft 74 externally of the valve body 12 for conjoint rotation with the cam shaft. An elongated actuating rod or arm 80 having upper and lower ends is affixed at its upper end to the bail 78 at about a right angle thereto such that the arm hangs down from the valve 10 along a line generally parallel to the valve body 12 when the valve is in the off, or closed position, as illustrated in FIG. 1. The actuating arm 80 includes a lower portion 82 and an upper portion 84 of a reduced cross-sectional area relative to that of the upper portion. A locking barrel 86, the function of which is described below in connection with FIGS. 6 and 7, is slidably retained on the upper portion 84 of the actuating arm 80. A ball 88 or other ornamental shape may be disposed at the lower end of the actuating arm 80, and functions both to add weight to the arm, and to shift the center of gravity of the arm toward the lower end thereof, for an automatic, gravity assisted shutoff of the valve 10, as described below.

Figures 8, 9:
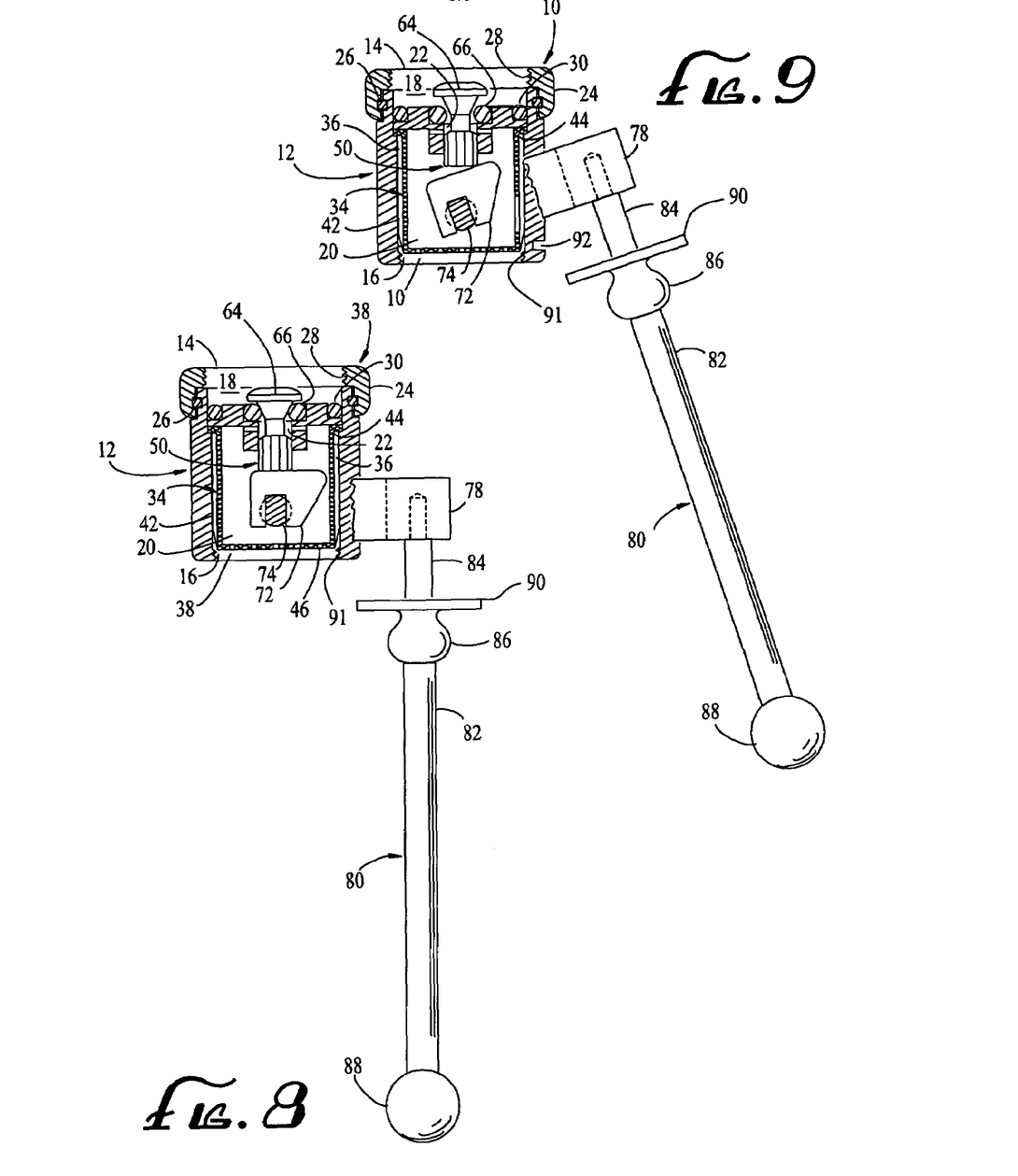
FIG. 8 is a partial cross-sectional elevation view of a second exemplary embodiment of a water-saving faucet valve in accordance with the present invention, showing the valve in an off, or closed, position.
FIG. 9 is view similar to FIG. 8, showing the second exemplary embodiment of the valve in the on, or open, position.
Figures 10, 11, 12:
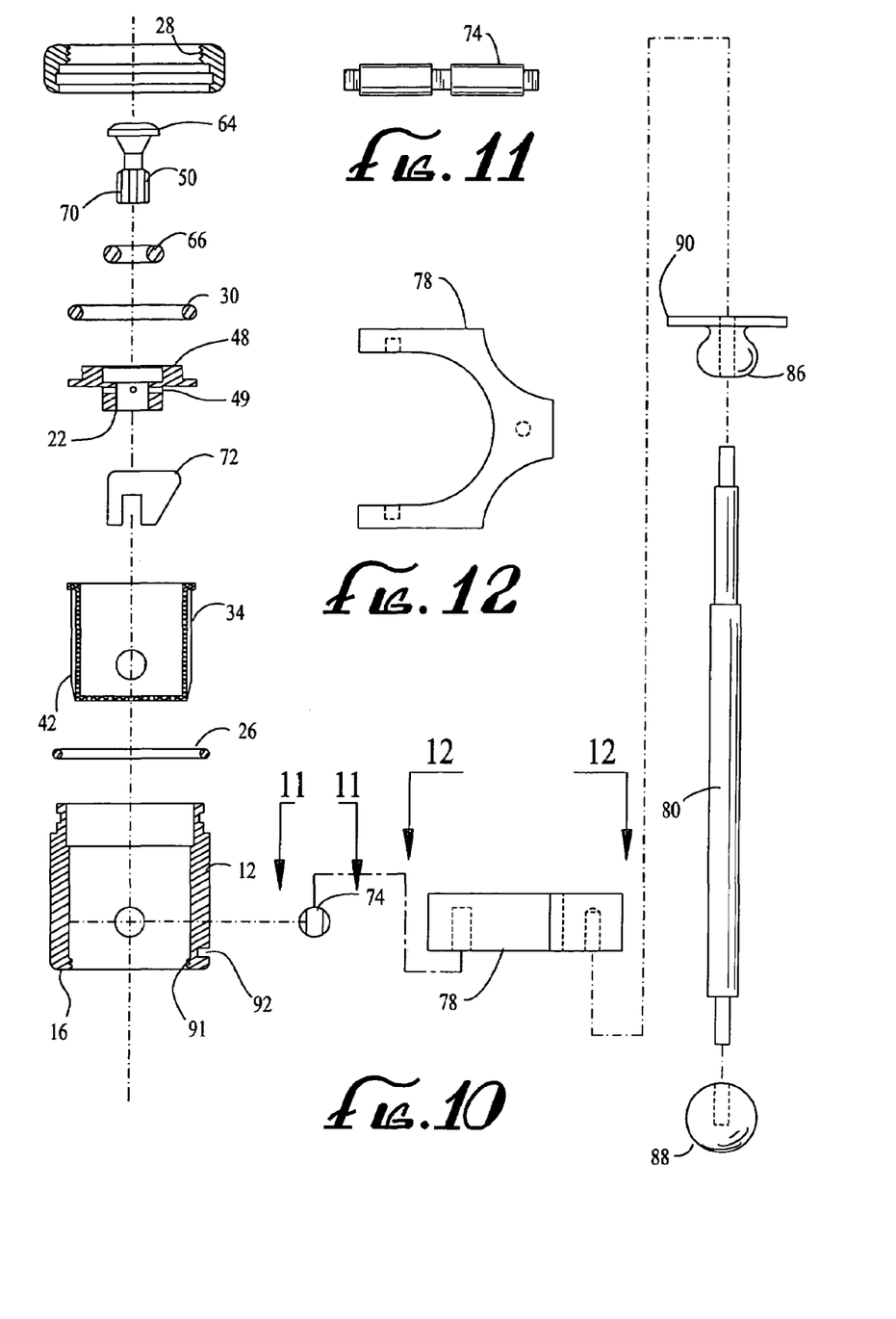
FIG. 10 is an exploded, partial cross-sectional elevation view of the second embodiment of the valve shown in FIGS. 8 and 9.
FIG. 11 is a top plan view of a cam shaft of the valve of FIG. 10, as viewed along the lines 11—11 taken in FIG. 10.
FIG. 12 is a top plan view of an actuating arm bail of the valve of FIG. 10, as viewed along the lines 12—12 taken in FIG. 10.

A second exemplary embodiment of the water-saving valve 10 is illustrated in FIGS. 8–9, wherein like elements are identified with like reference numbers. As illustrated in FIGS. 8 and 9, the second embodiment of the valve is substantially similar to the first embodiment in terms of its construction and operation, and differs from the first embodiment in the following particulars. As may be seen in FIGS. 8 and 9, in the second embodiment, the sealing ball 56 is eliminated, such that the elongated valve body 12 may be made shorter in length. The coaxial flow channel 22 is contained in separate, removable valve stem seat 48, as illustrated in FIG. 10, in which the valve stem 50 is seated for vertical sliding movement, as in the first embodiment above. The valve stem seat 48 may include a plurality of radial apertures 49 that cooperate with the radial valve stem flutes 70 to admit water into the low pressure chamber 20 and aerator 34 of the valve when the valve stem is raised from the off, or closed position, as illustrated in FIG. 8, to the on, or open position, as illustrated in FIG. 9. The upper, or sealing end 54 of the valve stem 50 can be provided with an enlarged, flattened head 64 having a marginal lower surface that overhangs and sealingly engages the sealing member 66 when the valve stem is in the lowered, valve-closed position. Additionally, the exterior sidewalls of the aerator 34 may incorporate flutes 42 in lieu of or in addition to the annular recess described above in connection with the first embodiment.

Figure 13:
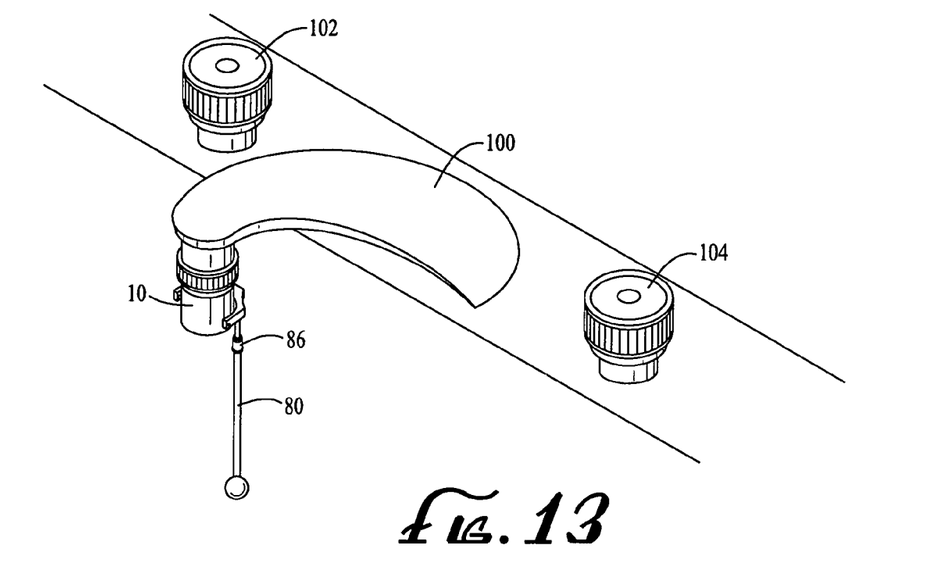
FIG. 13 is a partial perspective view of a standard faucet equipped with the water-saving faucet valve of the present invention, showing the valve in the off, or closed, position; and, FIG. 14 is view similar to FIG. 13, showing the valve in the open position.
Figure 14:
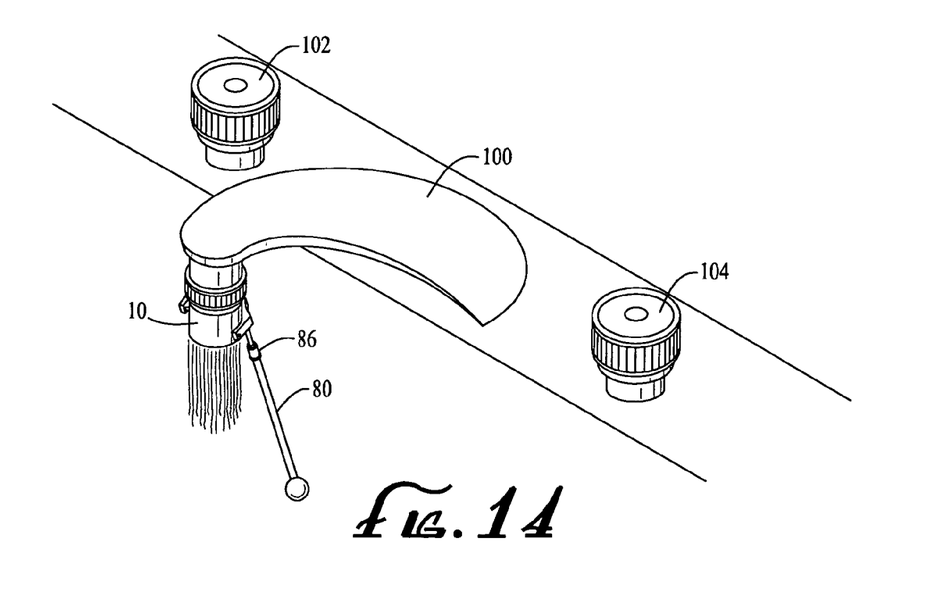

Operation of both the first and second embodiments of the novel valve 10 is identical, and is illustrated in FIGS. 1, 2, 8, 9, 13 and 14. In FIGS. 1, 8 and 13, the valve is shown in the closed position, with the actuating arm 80 hanging straight down from the valve. A slight lateral force exerted on the actuating arm 80 by, e.g., the upper or side surface of a user's hand, wrist, arm, or a drinking cup, causes the actuating arm 80 to swing upward through an angle relative to the axis of the valve 10, as shown in FIGS. 2, 9 and 14, thereby rotating the cam 72 on the cam shaft 74 against the follower plate 60 of the lower end of the valve stem 50. This movement simultaneously urges the valve stem and sealing ball 56 of the first embodiment, or alternatively, the flattened, overhanging sealing head 64 of the second embodiment, upward and away from the resilient sealing element 66, thereby breaking the seal between the flow channel 22 and the high-pressure chamber 18 of the valve, and permitting water to flow through the flow channel, into the aerator 34 in the low-pressure chamber 20 of the valve, and thence, out of the outlet end 16 of the valve.

When the actuating force is removed from the actuating arm 80, the weight of the arm causes the cam 72 and cam shaft 74 to rotate back to their initial, off, or closed position, as illustrated in FIGS. 1, 8 and 13, and the hydraulic pressure in the high-pressure chamber 18 forces the sealing ball 56 and sealing end 54, or alternatively, the sealing head 64, of the valve stem 50 back into sealing contact with the sealing element 66, thereby automatically shutting off the flow of water through the coaxial flow channel 22, and hence, from the valve 10. Thus, only a small angular movement of the actuating arm 80 is required to finely regulate the flow through the valve between a fully-off position (FIGS. 1, 8 and 13), and a fully-on position (FIGS. 2, 9 and 14), and only a very small force is required to effect such regulation. The ease and fineness of the flow regulation is as a result, inter alia, of the substantial amount of leverage on the valve stem 50 and sealing ball 56, or the sealing end 54 or 64, of the valve stem afforded by the actuating arm 80 and cam 72 of the valve.

As will be appreciated, there may be occasions when it is desirable to obtain an uninterrupted flow of water from the valve 10 without the need to hold the actuating arm 80 in the open position for an extended period, such as when filling a large basin or pitcher from the faucet. This operation is easily achieved with the valve 10 by use of the locking barrel 86 that is slidably disposed on the actuating arm 80, as illustrated in FIGS. 6 and 7. As shown in FIG. 6, the actuating arm 80 may be releasably locked in the valve-open position by sliding the locking barrel 86 on the upper portion 84 of the arm until a catch feature 90 thereon, such as a lip or flange on the locking barrel, engages a corresponding catch feature 92, such as a small pin or tang on (FIG. 6), or a recess in (FIG. 7), the valve body 12 in a locking engagement. The actuating arm 80 is thereby temporarily locked in the open position, causing water to flow continuously from the valve 10 until the catch features 90 and 92 are disengaged from one another. The release of the actuating arm 80 locking can be effected by simply tapping the arm in a lateral direction, whereupon the lip or flange on the locking barrel 86 will disengage the corresponding pin or recess on or in the valve body 12, thereby permitting gravity to return both the locking barrel to its original, lowered position on the actuating arm, and the actuating arm to the lowered, valve-off position, as described above and illustrated in FIGS. 1, 8 and 13.

Installation and initial adjustment of either of the exemplary embodiments of the novel valve 10 illustrated herein is easy and simple, and is effected by simply replacing the conventional, screw-on aerator of the spout 100 of a conventional standard faucet with the water saving valve, in the manner described above. As discussed and illustrated above in connection with FIGS. 6 and 7, after the valve is first installed, the actuating arm 80 is raised and temporarily locked in the fully open position with the locking barrel 86, as described above. The existing hot and cold water valves 102 and 104 (FIGS. 13 and 14) of the standard faucet are then adjusted until the temperature and rate of flow of water from the valve 10 are at the levels typically desired by the user. The actuating arm 80 is then released from the locked position to shut off flow from the valve 10, in the manner described above. The existing flow control valves 102 and 104 are then left in their respective "on" positions, and thereafter, flow from the faucet is regulated easily and exclusively by the manipulation of the actuating arm 80 on the valve 10 in the manner described above.

In either embodiment of the novel valve 10, the outlet end 16 of the valve can be advantageously provided with a mechanism 91, such as the internal threads illustrated in FIGS. 8–10, to enable coupling of an accessory item (not illustrated), e.g., a hose or a diverter, to the outlet end of the valve.

As will by now be appreciated by those of skill in the art, the valve 10 of the invention is simple and inexpensive to manufacture and assemble, and can be fabricated from a wide variety of materials, e.g., brass, steel, and certain high-strength plastics. Moreover, it can provided with a wide variety of decorative finishes, e.g., ceramic, chrome, or gold, as well as functional coatings or finishes. For example, the sealing ball 56 and/or the actuating arm 80 can be coated with a silver-containing anti-microbial compound to afford them antibacterial properties and eliminate the "cross-contamination" problem discussed above. Many other variations and modifications of the water saving valve 10 are also possible, depending on the particular needs of the user.

In light of the foregoing, the scope of the present invention should not be limited to the particular embodiments described and illustrated herein, as these are merely exemplary in nature. Rather, the scope of the present invention should by fully commensurate with that of the claims appended hereafter and their functional equivalents.

What is claimed is:

1. A water saving faucet valve, comprising:
an elongated, generally cylindrical valve body having an upper, inlet end and a lower, outlet end and defining:
an upper, high-pressure chamber opening to the inlet end,
a lower, low-pressure chamber opening to the outlet end, and
a coaxial flow channel interconnecting the high and low pressure chambers;
a valve stem slidably retained in the flow channel for axial movement between a lowered position and a raised position, the valve stem having:
an elongated shaft having an upper end with apparatus thereat for sealingly engaging the valve body at an upper end of the flow channel when the valve stem is in the lowered position, such that water is prevented from flowing through the flow channel from the high pressure chamber to the low pressure chamber, and for disengaging the valve body when the valve stem is in the raised position, such that water is permitted to flow through the flow channel from the high pressure chamber to the low pressure chamber, and
a lower end defining a cam follower;
a cam shaft rotatably mounted in the valve body below the valve stem and having a cam fixed thereon for conjoint rotation therewith, the cam having a camming surface disposed in a sliding engagement with the cam follower at the lower end of the valve stem; and,
an actuating arm connected to the cam shaft and movable between lowered and raised positions such that the cam respectively lowers and raises the valve stem between its lowered and raised positions, the actuating arm comprising:
a semicircular bail having opposite ends respectively connected to opposite ends of the cam shaft for conjoint rotation therewith; and,
an elongated rod affixed at a generally right angle to the bail such that the rod hangs down below the valve and along a line generally parallel to the axis of the valve body.

2. The valve of claim 1, wherein the valve stem upper end sealing apparatus comprises a sealing ball disposed in the high pressure chamber and concentrically above the upper end of the valve stem.

3. The valve of claim 1, wherein the valve stem upper end sealing apparatus comprises an enlarged, flattened head at the upper end of the valve stem.

4. The valve of claim 1, wherein the cam follower at the lower end of the valve stem shaft comprises a fenestrated plate, a roller rotatably mounted to the shaft, or a polished, hemispherical surface at the end of the shaft.

5. The valve of claim 1, wherein the elongated shaft of the valve stem includes one or more radial flutes.

6. The valve of claim 5, wherein the flutes taper radially inward to a successively greater depth toward the lower end of the valve stem.

7. The valve of claim 1, further comprising an aerator cup retained in the low-pressure chamber of the valve body, the aerator cup having:
a floor disposed adjacent to the outlet end of the valve, the floor containing a plurality of vertical apertures, and
annular side walls extending upwardly from the floor, the side walls containing a plurality of radial apertures.

8. The valve of claim 1, further comprising a weight disposed at a lower end of the rod.

9. The valve of claim 1, further comprising apparatus for temporarily locking the actuating arm in the raised position.

10. The valve of claim 9, wherein the temporary locking apparatus comprises:
a locking barrel slidably disposed on the elongated rod, the barrel having a first catch feature thereon; and,
a second catch feature on the valve body disposed to engage and hold the first catch feature of the locking barrel in a complementary, locking engagement when the actuating arm is in the raised position.

11. The valve of claim 10, wherein the first catch feature comprises lip or a flange on the locking barrel, and the second catch feature comprises a pin, tang or a recess on or in the valve body.

12. The valve of claim 1, further comprising a filter disposed at the inlet end of the valve body to filter out particulate matter in the water entering the valve.

13. The valve of claim 1, further comprising apparatus for coupling the inlet end of the valve to an outlet end of a standard faucet.

14. The valve of claim 13, wherein the faucet outlet coupling apparatus comprises internal or external threads at the inlet end of the valve body.

15. The valve of claim 13, wherein the faucet outlet coupling apparatus comprises an adaptor having first means at a first end thereof for sealingly engaging the outlet end of the standard faucet, and second means at an opposite second end thereof for sealingly engaging the inlet end of the valve body.

16. The valve of claim 1, further comprising apparatus for coupling an accessory to the outlet end of the valve.

* * * * *